Oct. 21, 1958     E. J. LIMPEL     2,857,539
INDUCTION MOTORS
Filed April 15, 1957
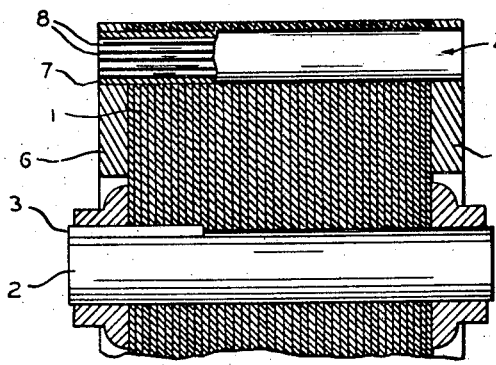
Fig.1
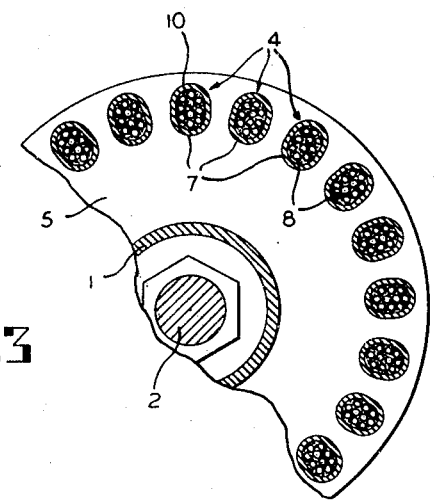
Fig.2
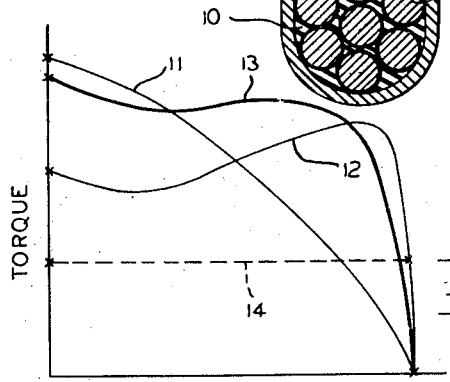
Fig.3
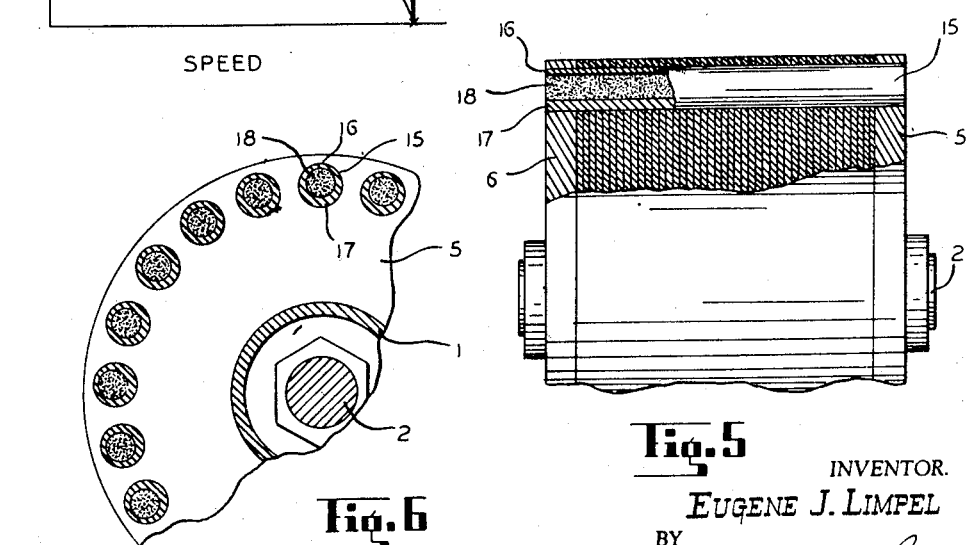
Fig.4
Fig.5
Fig.6
INVENTOR.
EUGENE J. LIMPEL
BY
Andrus & Scales
Attorneys

United States Patent Office

2,857,539
Patented Oct. 21, 1958

2,857,539
INDUCTION MOTORS

Eugene J. Limpel, Thiensville, Wis., assignor to A. O. Smith Corporation, Milwaukee, Wis., a corporation of New York Application April 15, 1957, Serial No. 652,845

10 Claims. (Cl. 310—211)

This invention relates to induction motors and particularly to rotor bars for an induction motor which establish a high starting torque.

Induction motors normally employ a plurality of circumferentially equi-spaced longitudinal conductors secured within axial openings in a rotor core. A current is induced through transformer action in the rotor bars by energizing a cooperating stator winding with an alternating current. The magnetic fields established by the windings effect rotation of the rotor. In order to obtain a high starting torque, the rotor bars must offer a relatively high resistance when the motor is first energized. However, if the resistance is large, the speed of the rotor under operating conditions varies substantially with small changes in load torque. Further the efficiency of an induction motor is directly proportional to the speed and a stable running speed is desired. Although a low resistance rotor bar gives stable running characteristics, the starting torque is poor.

The use of tubular rotor bars each having a solid high reactance insert completely filling the rotor bar has been suggested in order to employ the change in frequency of the induced current to control the speed-torque curve of the motor. At the first moment of starting an induction motor the induced rotor current is substantially the same frequency as the current impressed on the stator winding. As the rotor comes up to speed, the frequency of the rotor current is the difference between the frequency of rotor rotation and the frequency of the stator current, which at operating speed is normally only 2 or 3 cycles per second. This difference in starting frequency and running frequency of the rotor current is employed to vary the impedance of the rotor circuit.

In starting, the high frequency current is biased to the radially outermost surface of the rotor bar due to the well known skin effect phenomona whereby adjacent and oppositely flowing alternating currents are attracted to each other generally in proportion to the frequency of the current. The high permeable insert establishes a barrier to deep inward penetration of the flux and thus only the outermost portion of the rotor bar cuts the flux. The current is thus restricted to a relatively small cross-sectional area which offers a high resistance to current flow. This gives a high starting torque. As the rotor approaches operating speed, the frequency of the induced current is substantially reduced and, the insert rods do not appreciably affect the current distribution within the rotor bars. The current is therefore distributed throughout the rotor bars which now offer a relatively low resistance to the induced current flow. This establishes a good running characteristic.

In accordance with the present invention, tubular rotor bars are filled with a divided magnetic material. When the motor starts, the magnetic material establishes a high reactance to the starting current and concentrates the current in the outer peripheral surface of the rotor bar. When the motor comes up to speed, the frequency is decreased and correspondingly the reactance decreases. The use of a divided filler reduces establishment of any currents within the magnetic material and thereby reduces motor losses. Further, the torque characteristic established by the rotor is easily and simply varied by changing the composition or quantity of the filler material.

The present invention provides an induction motor having improved starting torque and running characteristics.

The accompanying drawing illustrates the best modes presently contemplated for carrying out the invention.

In the drawing:

Figure 1 is a longitudinal fragmentary section through an induction rotor;

Figure 2 is a fragmentary end view of the rotor shown in Figure 1;

Figure 3 is an enlarged cross sectional view of a rotor bar of Figures 1 and 2;

Figure 4 is an illustrative curve showing various starting torques and running characteristics;

Figure 5 is a view similar to Figure 1 of a second embodiment; and

Figure 6 is a fragmentary end view of Fig. 5.

Referring to the drawing and particularly Figures 1 and 2, a laminated rotor core structure 1 is secured to a shaft 2 in any suitable manner, such as by key 3. A plurality of rotor bars 4 are circumferentially spaced within axial openings in the outer periphery of the core structure. The rotor bars extend axially of the core 1 and are joined to each other at the adjacent ends by conducting end rings 5 and 6 respectively in any suitable manner, such as by welding. This forms a conventional squirrel cage type of induction rotor winding.

Each of the rotor bars 4 includes a tubular member 7 which is formed of a high electrically conducting material, such as copper or aluminum. As shown in Fig. 2, the tubular member has an oblong cross section with the longer axis lying on a radius of the core structure 1. A plurality of small rods or wires 8 completely fill the tubular member and are retained therein in any suitable manner, such as by a force fit. The small rods 8 are formed of a highly magnetic material, such as silicon iron, which is both economically and electrically satisfactory. A relatively small number of individual rods 8 having a substantial diameter are shown for clarity of illustration. In practice, a larger number of much smaller diameter rods is preferably employed.

A suitable electrically insulating coating 9 is provided on each of the small rods 8 to electrically insulate the rods from each other and from the member 7, as more clearly shown in Fig. 3. A suitable insulating coating 9 is obtained by formation of an iron oxide film in any well known manner. The insulating coating 9 prevents the establishment of induced circulating currents, normally denoted as eddy currents, in the bundle of individual insert rods 8. This increases the efficiency of the motor because any internally circulating currents would not contribute to the torque output but only generate heat and dissipate the input energy without any useful work output.

To increase the heat storage capacity of the filled rotor bars 4, a plastic filler 10, shown in the enlarged view of Fig. 3 of the drawing, fills the voids between the individual rods 8. The plastic filler 10 provides a good medium for transferring the heat created by the rotor current to the rods 8.

The relative size of the coating 9 and filler 10 in Fig. 3 is substantially enlarged to more clearly illustrate the elements.

The operation of the rotor is as follows:

The stator, not shown, which is associated with the rotor, is energized from a suitable alternating current power source, such as a conventional 60 cycle current. The iron filler rods 8, which are highly magnetizable and easily permit flux to pass establish a high reactance and concentrate the current in the upper portion of the conductor lying immediately adjacent the stator. This results in a high starting torque. When the motor comes up to speed, the rotor rotates at a speed which is just slightly less than the line frequency as previously described. The induced current in the rotor bars 4 is the same as the difference in frequency of the rotor and the impressed voltage. At such a low frequency, the iron rods 8 do not substantially affect the current distribution within the rotor bars. The current in the tubular member 7 is then distributed throughout the entire circumference of the member and a relatively low resistance to the current is present. This results in good running characteristics.

Referring to Fig. 4, curve 11 is representative of solid bars having a high resistance and therefore establishing a high starting torque but poor running characteristics. Thus, under running conditions it will be noted that relatively high changes in speed result from relatively small changes in torque. Curve 12 is representative of the operating characteristics with a solid bar or low resistance material. Here the starting torque is low but the running characteristics are good. Curve 13 is representative of the operating characteristics of a rotor constructed in accordance with the invention. Curve 13 lies generally intermediate curves 11 and 12 and provides both a relatively high starting torque and good running characteristics. The position or shape of the curve 13 can be varied within the present invention by varying the magnetic characteristics of some or all of the filler rods 8 or by varying the number of the filler rods 8.

For example, assume there is a load torque corresponding to the dotted horizontal line 14 in Fig. 4. The operating curve 11 gives a high starting torque but a slight change in load torque results in a large speed change and unstable operation. The operating curve 12 gives a very stable operating speed, but the starting torque is too low for economical application in commerce. However, the operating curve 13 established by the present invention gives both a sufficiently high starting torque and stable operating speed for practical applications.

Referring to Figs. 5 and 6, a second embodiment of the invention is there shown. Corresponding elements in the two embodiments are given the same number in their respective figures.

Generally, the two embodiments shown are the same except for the construction of the rotor bars and therefore, the corresponding elements other than the rotor bars are denoted by the same number in the various figures.

In the embodiment shown in Figs. 4 and 5, a plurality of generally round tubular members 15 are disposed within the rotor core 1 and short circuited by the end rings 5 and 6. The tubular members 15 are provided with a relatively thin outer wall portion 16 and with a relatively thick inner wall portion 17 to maintain the same total cross section of copper as with the uniform tubular members of Figs. 1–3. When starting the motor, the induced current is concentrated in the thin wall portion 16 which offers a relatively high resistance and consequently good starting torque. Then when the motor reaches operating speed, the induced current distributes itself throughout the tubular member which offers a relatively low resistance and consequently good operating characteristics.

A powdered filler 18 fills each of the tubular members 15. The filler 18 may be silicon iron or any other material having a high magnetic permeability to effect the rotor current distribution in the same general manner as the rod inserts 8 of Figs. 1–3. The powdered iron 18 is compressed or bound together by a suitable binder, not shown, to eliminate voids and to establish a self-supporting filler.

The individual particles of the filler 15 each have suitable insulating coatings, not shown, such as an iron oxide coating. The insulating coating serves to eliminate eddy currents, as previously described, with respect to the iron rods 8 of Figs. 1–4.

The curve resulting from the use of powdered iron would be generally similar to curve 13 of Fig. 4 depending on the composition of the filler material 15.

The torque and running characteristics of the embodiment shown in Figs. 5 and 6 may be varied in any one of three ways:

First, by varying the composition of the metals in the filler to thereby vary the magnetic properties of the filler. Second, by varying the proportions of the filler and binder with the magnetic permeability increasing as the quantity of metal used is increased. Third, by varying the degree of compression on the powdered iron and thereby varying the quantity of iron.

The round tubular members 15 of Figs. 5–6 may also be made with an oblong cross section as shown in Figs. 1–3 to combine the individual characteristics.

Further, the tubular members 15 may be employed as the stator windings with the thick wall portion 17 disposed adjacent the periphery of the rotor. A cooling fluid may then be passed through the members 15 to cool the members 15 and thereby increase the power which can be impressed on the stator winding.

The present invention provides an efficient induction motor having simple and economical means to vary the starting torque and running characteristics.

Various modes of carrying out the invention are contemplated as being within the scope of the following claims particularly pointing out and distinctly claiming the subject matter which is regarded as the invention.

I claim:

1. In an induction motor, a tubular rotor member adapted to be secured within a magnetic core structure and adapted to be connected in a rotor circuit, and a divided metallic filler secured within the tubular bar and substantially filling the rotor bar, said filler having a relatively high magnetic permeability.

2. A rotor bar for an induction motor, which comprises a tubular rotor bar adapted to be secured within an opening in a laminated core structure and adapted to be connected at each end to other similar rotor bars, and divided metal inserts disposed within the tubular rotor bar and substantially filling the rotor bar, at least some of said metal inserts being electrically insulated to prevent eddy currents, said inserts being formed of a relatively high permeable ferrous metal to establish a high starting torque rotor bar.

3. In an induction motor, a tubular rotor member adapted to be secured within a magnetic core structure and adapted to be connected in a rotor circuit, and a divided metallic filler secured within the tubular bar and substantially filling the rotor bar, said filler having a relatively high magnetic permeability and a plastic filler disposed within the tubular member to fill the voids within the tubular member and thereby increase the heat storage capacity of the tubular member.

4. In an induction motor having a laminated cylindrical rotor core structure, a plurality of tubular members each formed of a highly electrically conductive metal, said members having an oblong cross section and being secured one within each of a plurality of circumferentially equi-spaced axial openings in the rotor core structure, said openings having an oblong cross section corresponding to the members and having the major dimension disposed in a substantially radial direction, a highly permeable ferrous material disposed within each tubular member and substantially filling each member, said material being in a divided state, an oxide coating on the individual particles of the divided ferrous material to electrically insulate the particles from each other and thereby substantially reduce the establishment of eddy currents, means to secure the ferrous material within the tubular members, and means connecting the corresponding ends of the tubular members.

5. A tubular rotor bar for an induction motor, which comprises a tubular rotor bar formed of relatively high electrically conductive material, a plurality of ferrous metal rods of substantially the same length as said rotor bar, said iron rods being disposed within the tubular rotor bar and substantially filling the rotor bar, and means to secure the iron rods within the rotor bar during motor operation.

6. A tubular rotor bar for an induction motor, which comprises a tubular rotor bar formed of relatively highly electrically conductive material, a plurality of rods of a highly permeable ferrous metal having a diameter substantially less than the diameter of said rotor bar and having substantially the same length as said rotor bar, said rods completely filling the rotor bar and being pressed fitted to maintain the rods therein, and an oxide coating on said rods to electrically insulate the rods and eliminate eddy currents in the filler.

7. A tubular rotor bar for an induction motor, which comprises a tubular rotor bar formed of a relatively highly electrically conductive material, a powdered ferrous metal substantially filling the rotor bar, and means to secure the powdered iron within the rotor bar.

8. A tubular rotor bar for an induction motor having a laminated rotor core structure, which comprises a tubular member formed of a relatively highly electrically conductive metal and adapted to be secured within an axial opening in the laminated core structure, a compressed powdered ferrous metal filling the tubular member, and a binder intermixed with the powdered metal to support the powdered metal and maintain the powdered metal within the tubular member.

9. A tubular rotor bar for an induction motor having a laminated rotor core structure, which comprises a tubular member formed of a relatively highly electrically conductive metal and adapted to be secured within an axial opening in the laminated core structure, a compressed powdered ferrous metal filling the tubular member, said powdered metal having a thin oxide coating to electrically insulate the metal particles from each other, and a binder intermixed with the powdered metal to support the powdered metal and maintain the powdered metal within the tubular member.

10. In a dynamoelectric machine, a rotor member having a plurality of circumferentially spaced axial openings, tubular members secured one within each of said openings and extended axially therefrom, means to electrically connect the adjacent ends of said members, said members having a relatively thin wall portion adjacent the outer periphery of the rotor and having a relatively thick wall portion opposite said thin wall portion, and a divided magnetic filler having a high magnetic permeability disposed within said tubular members.

References Cited in the file of this patent

UNITED STATES PATENTS 2,433,671     March ---------------- Dec. 30, 1947